United States Patent [19]
Perhats, Sr.

[11] Patent Number: 6,116,513
[45] Date of Patent: Sep. 12, 2000

[54] SYSTEM FOR AFTER-RUN HEATING OF A VEHICLE INTERIOR

[76] Inventor: Frank J. Perhats, Sr., 607 Old Barn Rd., Barrington, Ill. 60010

[21] Appl. No.: 09/336,129

[22] Filed: Jun. 18, 1999

[51] Int. Cl.$^7$ .................................................. G05D 23/00
[52] U.S. Cl. ..................................... 237/2 A; 237/12.3 B
[58] Field of Search ............................. 237/12.3 B, 2 A; 165/1, 41, 42

[56] References Cited

U.S. PATENT DOCUMENTS

| | | | |
|---|---|---|---|
| 3,269,653 | 8/1966 | Howard | 237/2 A |
| 4,308,994 | 1/1982 | Perhats . | |
| 5,067,652 | 11/1991 | Enander | 237/81 |
| 5,294,050 | 3/1994 | Hoffman et al. | 237/2 A |

*Primary Examiner*—Harold Joyce
*Assistant Examiner*—Derek S. Boles
*Attorney, Agent, or Firm*—McEachran, Jambor, Keating, Bock & Kurtz

[57] ABSTRACT

A system for continuing heating of a vehicle interior after the engine which normally controls the heating of the vehicle has been turned off. The system comprises a first control circuit located in the engine compartment of the vehicle which continues to pump heated engine coolant through the heater core of the vehicle after the engine has been turned off. A second control circuit located in the passenger compartment of the vehicle continues to operate the heater fan which blows air through the heater core and into the passenger compartment after the engine has been turned off. Thermostats in each circuit are operative to disconnect the battery when the coolant temperature is no longer effective to heat the passenger compartment. The first and second control circuits have no mechanical, electrical or electromagnetic interconnection therebetween.

12 Claims, 2 Drawing Sheets

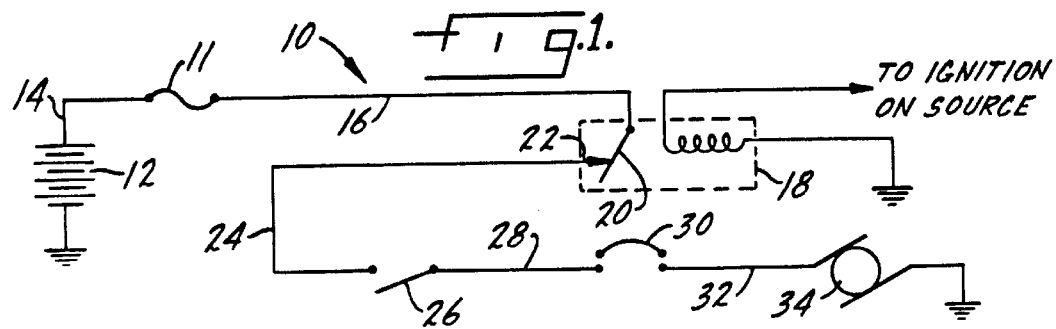
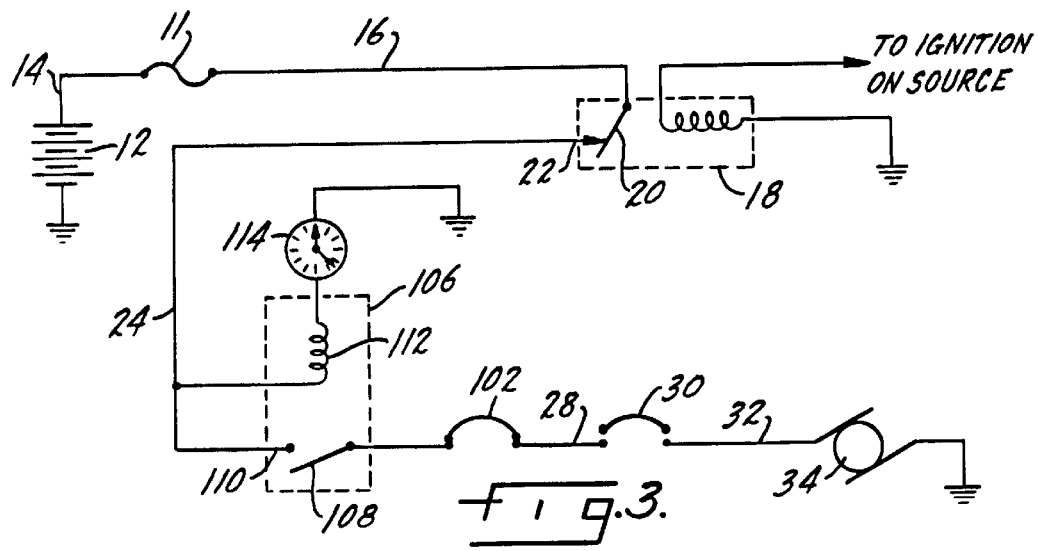
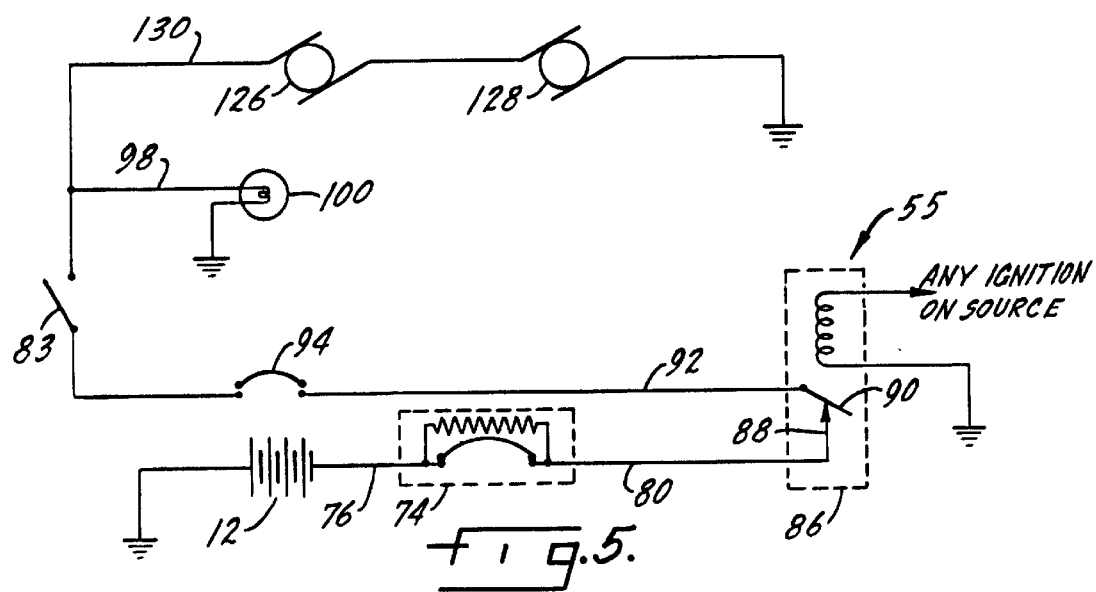

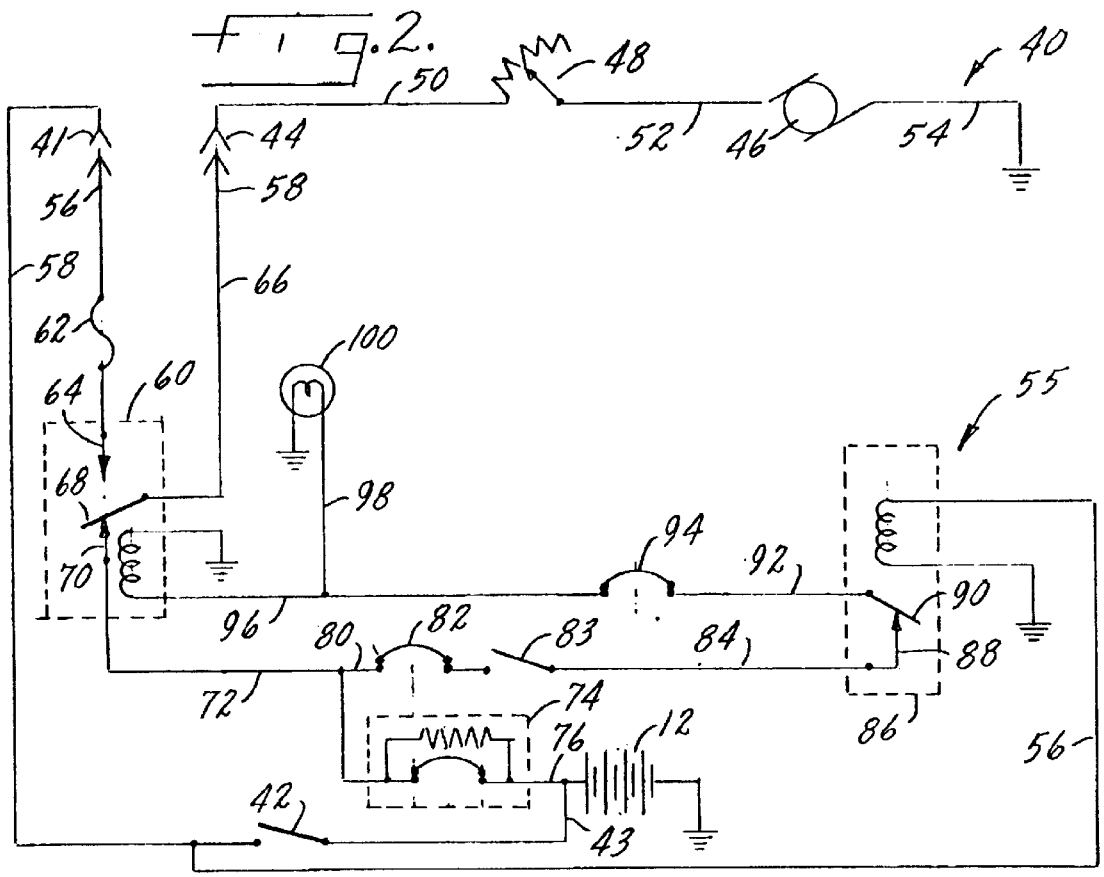
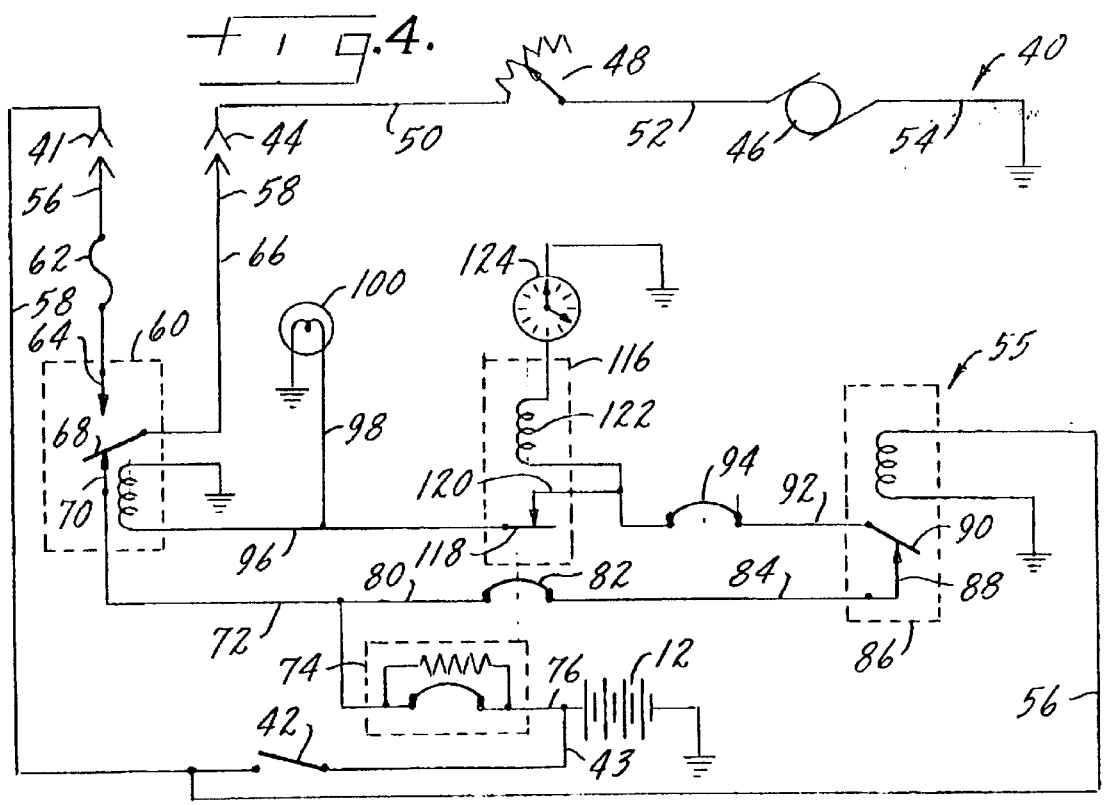

SYSTEM FOR AFTER-RUN HEATING OF A VEHICLE INTERIOR

BACKGROUND OF THE INVENTION

The present invention relates to automotive and vehicular heating systems, and more particularly, to an improved system for continuing the heating of an automotive or vehicular interior after the engine has been turned off.

In most vehicles having a water cooled engine a hot water circulation conduit or circuit is provided which uses the heated engine coolant to provide heat to the passenger compartment of the vehicle. When the engine is operating hot coolant from the engine is circulated through a heater core. A heater fan pushes air through the core, where it is heated by the hot engine coolant, and into the passenger compartment. It will be understood that the term heater fan is used herein to refer to the main fan or blower of a vehicle's interior heating, ventilating and air conditioning system.

In the past in order to keep a vehicle's passenger compartment warm, it was necessary to leave the engine idling, even if the vehicle was stationary or unoccupied. Only with the engine idling could hot coolant be pumped through the heater core. Such engine idling to keep the passenger compartment warm is a particular problem with police vehicles, taxi cabs, delivery trucks, utility trucks, or any other vehicle driven as part of an occupation requiring continuous or repetitive vehicle use together with periods of driver absence. Excessive idling causes unnecessary fuel consumption and air pollution.

In order to combat this problem after-run heaters have been developed for continuing the heating of vehicle interiors after the engine is turned off. After-run heaters rely on the fact that the engine coolant retains appreciable amounts of usable heat after the engine is shut off. Without an after-run heater that heat is dissipated to atmosphere and wasted. An after-run heater utilizes much of the coolant heat by transferring it into the passenger compartment. An example of such a heater is shown in Perhats, U.S. Pat. No. 4,308,994, the disclosure of which is incorporated herein by reference. A magnetically coupled pump with low battery drain, along with auxiliary control components, is utilized to circulate the still-hot engine coolant through the vehicle's heater core and to run the vehicle's heater fan while the engine is off.

In the most sophisticated, fully automatic systems, on-off seasonal switches, relays, temperature sensors and interconnecting wires are used to automatically sense if the engine is running, whether continued heating is necessary, and whether the engine coolant is warm enough to provide sufficient heat to the passenger compartment. Pump and heater fan operations are automatically terminated when the coolant temperature drops below a predetermined level and can no longer provide sufficient heat, thereby preventing unnecessary battery drain.

The system on-off, or "seasonal" switch may be left on throughout the heating season so that after-run control of the heating system is automatically provided each time the engine is turned off. Operation of the auxiliary heating system typically continues until one of the following four things happens: (1) the seasonal switch is turned off; (2) the ignition switch is turned on and the engine resumes control of coolant circulation; (3) the coolant temperature falls below a predetermined level; or (4) an optional timer times out. In each of these instances the engine cooling system and passenger compartment heating system return to normal and operate as if the after-run heating system were not present.

Known after-run heating systems have components located both in the passenger compartment as well as in the vehicle's engine compartment. Typically components such as the seasonal switch, indicator light and fan motor controls have been located in the passenger compartment inside or under the dash, while the engine coolant pump and temperature sensor have been located in the engine compartment. Prior systems required interconnection of these remote components by wiring. The need for installing wiring between the engine and passenger compartments makes installation of these systems difficult and time consuming for professionals and amateurs alike. Modern vehicles have no readily accessible openings in the fire wall between the two compartments through which wires may be passed.

SUMMARY OF THE INVENTION

The present invention provides a system for controlling after-run heating of a vehicle's interior which eliminates the need to electrically interconnect through wiring the components under the hood with those under the dash. This simplified system reduces the cost and time involved in installation and is more widely acceptable in the aftermarket, where the majority of after-run heating systems are sold.

Accordingly, the present invention provides a system for controlling heating of a vehicle interior after the engine has been turned off. The system comprises a pump and first control circuit therefor located in the engine compartment of the vehicle. The control circuit allows the pump to continue circulating heated engine coolant through the heater core of the vehicle after the engine has been turned off. A second control circuit located in the passenger compartment of the vehicle continues to operate the heater fan which blows air through the heater core and into the passenger compartment after the engine has been turned off. The first and second control circuits have no mechanical, electrical or electromagnetic interconnection therebetween but nevertheless are interrelated and codependent.

BRIEF DESCRIPTION OF THE DRAWINGS

FIG. 1 is a circuit diagram of the components located in the engine compartment (under the hood) for a semi-automatic system.

FIG. 2 is a circuit diagram of the components located in the passenger compartment (under or inside the dash) for a semi-automatic system.

FIG. 3 is a circuit diagram of the components located in the engine compartment (under the hood) for an automatic system.

FIG. 4 is a circuit diagram of the components located in the passenger compartment (under or inside the dash) for an automatic system.

FIG. 5 is a circuit diagram of the components located in the passenger compartment (under or inside the dash) for an alternate embodiment of an automatic system.

DETAILED DESCRIPTION OF THE INVENTION

The present invention comprises two separate systems of components which are remote from one another and not interconnected. One component system is located in the engine compartment, i.e., under the hood. This component system is responsible for circulating hot engine coolant after the engine has been turned off. The second component system is located in the passenger compartment, typically under or inside the dash. This system is responsible for controlling the heater fan after the engine has been turned off.

The engine compartment system 10 of FIG. 1 includes a fuse 11 connected to the positive terminal of vehicle battery 12 through a conductor 14. The negative terminal of battery 12 is grounded. Conductor 16 connects fuse 11 to a normally-closed, single-pole, single-throw (SPST) relay 18 having a contact 20. SPST relay 18 is energized by a power source available only when the vehicle ignition is on.

Contact 20 of relay 18 is open when relay 18 is energized by the ignition-on power source (when the engine is running). When relay 18 is deenergized by the engine being turned off, contact 20 closes by engaging terminal 22. In FIG. 1 engine compartment system 10 is shown in a state with the engine turned off and contact 20 closed.

Terminal 22 is connected via conductor 24 to a seasonal on/off switch 26. The other side of switch 26 is connected via conductor 28 to thermostat 30 which is located where it will sense the engine coolant temperature and open when the temperature falls below a selected value. Conductor 32 connects thermostat 30 with a pump 34, which may be either a magnetically coupled or conventional seal-type centrifugal pump. Pump 34 is connected to the vehicle ground. The pump is located in the hot coolant circulation line or conduit between the engine and the heater core.

The passenger compartment portion of the system is illustrated in FIG. 2. It includes an existing system 40 and an auxiliary system 55. Existing system 40 controls the heater fan while the engine is on. System 40 includes the vehicle ignition switch 42 connected through conductors 43 and 76 to the vehicle battery 12. The other side of ignition switch 42 is connected through conductor 58 and conductor 50 to the heater fan or blower motor 46 which circulates air within the passenger compartment. Fan speed control 48 is connected between a load side connector 44 and the heater fan motor 46 by conductors 50 and 52. Conductor 54 leads from heater fan motor 46 to ground. It should be noted that in some vehicles, speed control 48 may be located on the ground, rather than the load, side of fan motor 46. This does not affect the function or installation of the present system.

Auxiliary system 55 controls operation of heater fan motor 46 when the engine is off. Connectors 41 and 44 are used to tap the passenger compartment portion of the after-run heating system into existing fan motor circuit 40. Preferably, connectors 41 and 44 are located at the fuse block. If such a tap is not readily available, however, the circuit 55 may be tapped into circuit 40 anywhere between fan motor speed control 48 and the load side connection. If speed control 48 is located on the ground side of heater fan motor 46, the circuit 55 must be tapped in between fan motor 46 and the load side connection. The dotted line between connectors 41 and 44 indicates that these were previously connected and that circuit 55 was spliced into this conductor.

Circuit 55 includes a normally-open, single-pole, double-throw (SPDT) relay 60. Conductor 66 extends between contact 68 in relay 60 and a connector 58 which mates with the connector 44 in conductor 50. SPDT relay 60 is controlled (energized or deenergized) by a normally-closed single-pole, single-throw (SPST) relay 86, which is in turn controlled through conductor 56 by the ignition switch 42. When SPDT relay 60 is energized, contact 68 engages terminal 70, placing the existing circuit 40 in series with circuit 55. When SPDT relay 60 is deenergized, contact 68 engages terminal 64, disconnecting circuit 55 and connecting circuit 40 (via fuse 62 and connectors 56 and 41) directly to the vehicle battery 12 for operation.

Terminal 70 of relay 60 is connected via conductor 72 to an autoreset circuit breaker 74, which in turn is connected by conductor 76 to the positive terminal of vehicle battery 12. Thus, when contact 68 engages terminal 70, battery 12 is placed in series with existing circuit 40. Circuit breaker 74 limits the fan speed setting at speed control 48 by opening if the current draw of heater fan motor 46 exceeds a predetermined level. This limits excessive drain on battery 12 while the engine is not running. Circuit breaker 74 can be the cycling type or the shunt type which remains open once tripped until the load is removed from the fan motor.

Conductor 80 branches from conductor 72 to a vehicle interior ambient temperature sensing thermostat 82. Thermostat 82 is located in the passenger compartment where it can sense the air temperature in the compartment. The thermostat is set at about 85° F. Thus, if the vehicle interior temperature is already at or above 85° (due to heating from the sun, ambient exterior air or perhaps overuse of the heater) thermostat 82 will open and prevent any further introduction of warm air into the passenger compartment.

The thermostat 82 is connected to a seasonal on/off switch 83. This is a manual switch the user can use to disable the circuit 55 when after-run heating in not needed or desired. Switch 83 is connected via conductor 84 to terminal 88 of single-pole, single-throw (SPST) relay 86. As mentioned above, relay 86 is controlled by a power source which is available only when the ignition switch 42 is closed. Thus, when the vehicle ignition is on, the coil of relay 86 is energized and contact 90 is open. When the vehicle ignition is turned off, contact 90 closes against terminal 88.

Contact 90 of SPST relay 86 is connected by conductor 92 to a thermostat 94 which is located in the heater plenum air discharge for sensing the temperature of air blowing into the passenger compartment. Thermostat 94 is normally open and closes on rise at about 85° F. and reopens at about 65° F. Thermostat 94 is set to open at about 65° F. so that if the temperature of the air from the heater core drops to this temperature, the heater fan motor 46 will be shut off. Conductor 96 leads from thermostat 94 to the coil of SPDT relay 60. Conductor 98 branches from conductor 96 to a pilot or indicator light 100.

Circuit 10 of FIG. 1 and circuit 55 of FIG. 2 are not interconnected, but work in concert to warm the vehicle interior while the engine is shut off, if conditions are appropriate. Circuit 10 powers pump 34 to substitute for the engine pump and keep engine coolant circulating through the heater core after the engine has been shut off, for so long as the coolant temperature exceeds the threshold set in thermostat 30. Circuit 55 powers the heater fan motor 46 while the engine is off, if the ambient temperature in the vehicle compartment is below the setting of thermostat 82 and the air exiting the heater plenum is above the setting of thermostat 94.

Operation of circuit 10 is now described in more detail. SPST relay 18 is powered by any ignition-on underhood source such as the primary of the engine ignition system. When the ignition is on, the SPST relay coil 18 is energized thereby moving contact 20 out of engagement with terminal 22 and disconnecting the circuit 10 control system from the battery. In this state, hot coolant is circulated through the heater core by the engine's water pump; auxiliary pump 34 is not needed.

When the vehicle is stopped and the engine is turned off, relay 18 is deenergized and contact 20 engages terminal 22. Auxiliary pump 34 is thus brought into series with and may be powered by battery 12. If seasonal switch 26 is on (closed) and coolant temperature sensor 30 is closed (indicating that the engine coolant has reached a sufficiently high temperature to provide heat), pump 34 will be energized and begin pumping engine coolant through the heater core. If seasonal switch 26 is off or sensor 30 open (coolant not hot enough), no pumping will occur.

Normally, seasonal switch 26 is located under the hood and is manually turned permanently on and off at the beginning and end of the heating season, respectively. There is no need to turn seasonal switch 26 on and off with every driving session. Thermostat 30 is preferably a part of pump 34 and senses the temperature of coolant entering the pump, which temperature will be close to that of the coolant entering the heater core. When the engine is off and pump 34 is operating, thermostat 30 continuously monitors the coolant temperature and disconnects pump 34 from the battery when sufficient heat can no longer be provided to the passenger compartment. Thus, needless battery drain does not occur.

When the engine is restarted, relay 18 is energized and contact 20 opens, disconnecting pump 34 and returning control of coolant circulation to the engine cooling system. As mentioned above, pump 34 may also be deactivated if thermostat 30 opens due to the temperature of the engine coolant falling below a predetermined level.

Operation of the heater fan control circuit 55 is as follows. While the engine is on, the coil of SPST relay 86 is energized through ignition switch 42 and conductor 56 and therefore contact 90 remains open (out of contact with terminal 88). With SPST relay 86 presenting an open circuit, SPDT relay 60 cannot be powered or energized by battery 12. In its deenergized state, contact 68 of relay 60 contacts terminal 64. Thus, while the engine is on, heater fan motor 46 is powered directly by the vehicle electrical system through conductors 43/58, connectors 41, 56, fuse 62, terminal 64, contact 68, conductor 66, connectors 58, 44, conductor 50, speed control 48 and conductor 52.

Thermostat 94, located in the heater plenum air outlet, senses the temperature of air entering the passenger compartment. If a predetermined temperature is met (such as about 85° F. as mentioned above) thermostat 94 closes. If the limit of vehicle interior ambient temperature thermostat 82 is not exceeded, thermostat 82 will remain closed. Thus, when the engine has run sufficiently long to warm the heater core (and thereby the air in the heater plenum), all circuitry between battery 12 and relay 60 is closed except for contact 90 of relay 86. Relay 86 remains open as long as the engine is running.

When the engine is turned off, relay 86 is deenergized and contact 90 closes on terminal 88. This places the coil of SPDT relay 60 in series with battery 12. Relay 60 is energized, causing contact 68 to close on terminal 70. In this state, it can be seen that heater fan motor 46 is now under the control of circuitry 55. Heater fan motor 46 is serially connected to battery 12 via conductor 76, circuit breaker 74, conductor 72, terminal 70, contact 68, conductor 66, connectors 58, 44, conductor 50, speed control 48 and conductor 52. Pilot light 100 is illuminated to indicate operation of control circuit 55.

While the engine is off, control circuit 55 continues to run the heater fan motor until thermostat 94 senses that the heated air being blown into the vehicle has dropped below a predetermined level. When this occurs the thermostat 94 will open the circuit and relay 60 will be deenergized. Contact 68 moves back out of engagement with terminal 70, disengaging circuit 55. Since the vehicle engine is off, heater fan motor 46 will stop. Alternately, the vehicle's interior ambient temperature may rise to a level that will cause thermostat 82 to open, thereby deenergizing relay 60 so contact 68 opens, cutting circuit 55 out of the fan control loop.

Circuits 10 and 55, though not electrically interconnected, cooperate to prevent needless battery drain when warm air can no longer be provided to the vehicle interior (or is no longer needed). Once the engine coolant has dropped below a certain temperature, thermostat 30 of circuit 10 will open, cutting off the power supply to pump 34 and ceasing the flow of water into the heater core. Consequently, heater fan motor 46 begins to blow cold, unheated air into the passenger compartment. Thermostat 94 opens soon thereafter, deenergizing relay 60 and cutting off the power to heater fan motor 46.

Thus, with no electrical, mechanical or electromagnetic connection between circuit 10, located in the engine compartment, and circuit 55, located in the passenger compartment, an interrelated codependent system has been established. Elimination of the requirement to establish a hard-wired connection between the two systems greatly simplifies installation.

The embodiment of FIGS. 1 and 2 may be considered a semi-automatic system in that the user must operate the manual seasonal switches 26 and 83 to enable and disable the system, as dictated by the time of year. Once enabled the system is automatic. The system may be made fully automatic by replacing manual switches 26 and 83 by thermostats 102 and 82, as shown in FIGS. 3 and 4. The thermostat 102 is responsive to vehicle exterior ambient air temperature. Or, instead of replacing seasonal switches 26 and 83, the exterior ambient thermostat 102 may be added in series with the switches to automatically disable the system on abnormally warm days during the heating season.

The embodiment shown in FIGS. 3 and 4 also incorporates backup terminating devices in the form of a relay-controlled timer in each of the circuits. The timers permit circuits 55 and 10 to operate for a pre-determined maximum length of time, even if the status of the various thermostats would otherwise call for longer operation. This is to prevent battery drain in the event of unusual temperature conditions that might otherwise allow circuits 10 and 55 to run pump 34 and fan motor 46 indefinitely.

Looking first at FIG. 3, a normally-open, single-pole, single-throw (SPST) relay 106 is placed in the circuit between relay 18 and thermostat 102. Relay 106 has a contact 108 connected to thermostat 102, a terminal 110 connected to conductor 24, and a coil 112 connected between conductor 24 and a timer 114. When relay 18 closes, timer 114 is energized through coil 112 and contact 108 closes. Assuming both thermostats 102 and 30 are closed, pump motor 34 will start. Under conditions where the exterior ambient air is too cool to open thermostat 102 but too warm to reduce significantly the engine coolant temperature, and therefore the thermostat 30 does not open either, the timer 114 will time out and open the circuit through coil 112. With coil 112 de-energized, contact 108 will open and stop the pump motor 34.

Turning now to the alternate under-dash circuit of FIG. 4, a normally-open, single-pole, single-throw (SPST) relay 116 is placed in the circuit between relay 86 and relay 60. Relay 116 has a contact 118 connected to relay 60 via conductor 96, a terminal 120 connected to thermostat 94, and a coil 122 connected between conductor 92 and a timer 124. When relay 86 closes, timer 124 is energized through coil 122 and contact 118 closes. Assuming thermostats 82 and 94 are closed, fan motor 46 will start. Should all of the thermostats fail to open the timer 124 will reach its preset time and open the circuit to the coil 122, thereby turning the motor 46 off by opening contact 118. The timer remains deenergized, nonfunctional and ready to begin a new timing cycle at such time as it is once again energized by the closing of contact 90 on relay 86, assuming thermostat 94 is also closed.

The timers 114 and 124 may be relatively simple and low cost electronic timing devices using, for example, an astable oscillator such as an LM555 or similar source. Alternately, a quartz crystal and dividing network could be used. When power is interrupted for any reason the timers will reset to zero and restart timing when once again powered. Preferably the maximum running time is selectable. It is intended that the installer will select the maximum running time based on the simple criteria of the number of engine cylinders. By way of example only, a rotary switch may be provided with markings indicating 4, 6 and 8 (to correspond with the number of cylinders) which would produce running times of 45, 75 and 105 minutes, respectively.

The timer-equipped under-dash circuit of FIG. 4 can also provide the user with a summer comfort device that alleviates the build-up of excess heat in the interior due to sunlight (the greenhouse effect). This is done by automatically permitting a predetermined length of running time of the heater fan to vent this heat. This is accomplished by leaving the seasonal switch 83 in FIG. 2 on. In summer weather heater plenum thermostat 94 will be closed because of ambient heat and not heat imparted to it by hot water in the heater core. By opening seasonal switch 26 (FIG. 1) when ambient thermostat 102 (FIG. 3) is open, pump 34 is deenergized and no hot coolant is pumped into the heater core. Also, in warm weather the heater blower draws air around the heater core when the temperature selector switch is off or calling for cool air. Thus, the fan runs and draws cooler outside aire into the vehicle keeping the interior at or just above outside ambient. The timer will permit a limited run time of the blower motor turning it off after a predetermined run time.

FIG. 5 illustrates a further alternate form of the under-dash circuit in which many of the same circuit elements as in FIG. 2 are used so their description will not be repeated. In this embodiment auxiliary fan motors 126 and 128 are installed in the vehicle's heater plenum and activated through conductor 130. With two auxiliary fans one can be installed on the driver's side and one on the passenger side of the vehicle. In some installations it may be preferable to have only one auxiliary fan. The auxiliary fans are used by the after-run heating system instead of the vehicle's heater fan. This arrangement allows complete isolation of the after-run heating system from the vehicle's equipment, except for the battery, ground and ignition sensing.

Various features of the present invention have been explained with reference to the embodiments shown and described. It must be understood, however, that modification may be made without departing from the spirit and scope of the invention as represented by the following claims. For example, the temperature settings of the thermostats could be other than those indicated. Also, the various components shown as mechanical sensors, circuit breakers and electromagnetic relays could be substituted for by electronic equivalents. An electronic battery voltage monitor could optionally be placed in series with the plenum and ambient temperature thermostats to shut down the system in the event of low battery voltage. An auxiliary battery, separate from the vehicle battery, could be substituted for the vehicle battery shown in the drawings. The auxiliary batter is connected in parallel to the vehicle battery. When the engine is started both the vehicle battery and auxiliary battery would be recharged.

What is claimed is:

1. In a vehicle of the type having an engine compartment and a passenger compartment, an engine cooled by a liquid coolant which is circulated by a water pump through the engine, a heating conduit and a heater core, a vehicle electrical system including a battery, a heater fan in the passenger compartment for circulating air through the heater core and into the passenger compartment, the improvement comprising an after-run heating system for continuing heating of the passenger compartment after the engine has been shut off, comprising:

a first control circuit located in the engine compartment of the vehicle;

an auxiliary pump disposed in the heating conduit and controlled by the first control circuit for pumping heated engine coolant through the heater core of the vehicle after the engine has been turned off; and a second control circuit located in the passenger compartment of the vehicle for controlling operation of the heater fan after the engine has been turned off, said first and second control circuits being free of mechanical, electrical or electromagnetic interconnection therebetween.

2. The after-run heating system of claim 1 wherein the first and second control circuits are powered by the vehicle electrical system's battery.

3. The after-run heating system of claim 2 wherein the first control circuit includes a thermostat for sensing the temperature of the heated engine coolant and disconnecting the auxiliary pump from the battery when said coolant temperature falls below a predetermined level.

4. The after-run heating system of claim 3 wherein the second control circuit includes a thermostat which senses the temperature of the air being blown into the passenger compartment and disconnects the battery from the heater fan when said air temperature falls below a predetermined level.

5. The after-run heating system of claim 1 further including means for activating the first control circuit immediately after the engine is turned off.

6. The after-run heating system of claim 5 wherein said means for activating the first circuit is a single-pole, single-throw relay which is deactivated upon removal of an ignition-on only power source.

7. The after-run heating system of claim 1 further including means for activating the second circuit immediately after the engine is turned off.

8. The after-run heating system of claim 7 wherein said means for activating the second circuit comprises a first single-pole, single-throw relay which is deactivated upon removal of an ignition-on only power source.

9. The after-run heating system of claim 8 wherein said means for activating the second circuit further comprises a second single-pole, single-throw relay that is energized by the vehicle battery upon deenergization of said first single-pole, single-throw relay, the energization being effective to place the second control circuit between the vehicle battery and the heater fan.

10. The after-run heating system of claim 1 wherein at least one of the first or second circuits includes a timer for limiting the maximum duration of operation of said circuits.

11. The after-run heating system of claim 1 further comprising an auxiliary battery connected in parallel with said vehicle electrical system battery.

12. In a vehicle of the type having an engine compartment and a passenger compartment, an engine cooled by a liquid coolant which is circulated by a water pump through the engine, a heating conduit and a heater core, a vehicle electrical system including a battery, a heater fan in the passenger compartment for circulating air through the heater core and into the passenger compartment, the improvement comprising an after-run heating system for continuing heating of the passenger compartment after the engine has been shut off, comprising:

a first control circuit located in the engine compartment of the vehicle;

an auxiliary pump disposed in the heating conduit and controlled by the first control circuit for pumping heated engine coolant through the heater core of the vehicle after the engine has been turned off;

an auxiliary heater fan and motor for driving said fan disposed in the passenger compartment; and a second control circuit located in the passenger compartment of the vehicle for controlling operation of the auxiliary heater fan after the engine has been turned off, said first and second control circuits being free of mechanical, electrical or electromagnetic interconnection therebetween.

\* \* \* \* \*